United States Patent
Lee et al.

(10) Patent No.: US 8,265,007 B2
(45) Date of Patent: Sep. 11, 2012

(54) METHOD FOR RECEIVING SYSTEM INFORMATION IN MULTIMEDIA BROADCAST/MULTICAST SERVICE

(75) Inventors: Young-Dae Lee, Gyeonggi-Do (KR); Sung-Duck Chun, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 12/521,503

(22) PCT Filed: Jan. 30, 2008

(86) PCT No.: PCT/KR2008/000569
§ 371 (c)(1),
(2), (4) Date: Jun. 26, 2009

(87) PCT Pub. No.: WO2008/093997
PCT Pub. Date: Aug. 7, 2008

(65) Prior Publication Data
US 2010/0103854 A1  Apr. 29, 2010

(30) Foreign Application Priority Data
Jan. 29, 2008  (KR) .................. 10-2008-0009262

(51) Int. Cl.
*H04W 4/00* (2009.01)
(52) U.S. Cl. ..... 370/328; 370/342; 370/479; 455/422.1; 455/517
(58) Field of Classification Search ............... None
See application file for complete search history.

(56) References Cited

U.S. PATENT DOCUMENTS

| | | |
|---|---|---|
| 6,665,313 B1 | 12/2003 | Chang et al. |
| 6,697,347 B2 | 2/2004 | Ostman et al. |
| 7,006,464 B1 | 2/2006 | Gopalakrishnan et al. |
| 7,158,504 B2 | 1/2007 | Kadaba et al. |
| 7,295,573 B2 | 11/2007 | Yi et al. |
| 2002/0174276 A1 | 11/2002 | Jiang |
| 2003/0040314 A1 | 2/2003 | Hogan et al. |
| 2003/0095519 A1 | 5/2003 | Kuo et al. |
| 2003/0157953 A1 | 8/2003 | Das et al. |
| 2003/0181221 A1 | 9/2003 | Nguyen |
| 2003/0189912 A1 | 10/2003 | Laitinen et al. |
| 2003/0210669 A1 | 11/2003 | Vayanos et al. |

(Continued)

FOREIGN PATENT DOCUMENTS

EP  1432261 A1  6/2004

(Continued)

OTHER PUBLICATIONS

"Universal Mobile Telecommunications System (UMTS); High Sped Downlink Packet Access (HSDPA); Overall description; Stage 2 (3GPP TS 25.308 version 7.1.0 Release 7); ETSI TS 125 308" ETSI Standards, vol. 3-R2, No. V7.1.0, Dec. 1, 2006 XP014039997.

(Continued)

*Primary Examiner* — Jeffrey M Rutkowski
(74) *Attorney, Agent, or Firm* — Birch, Stewart, Kolasch & Birch, LLP (57) ABSTRACT

The present invention allows the terminal not to receive the same system information from corresponding cell when the terminal is moved to another cell within the global MBMS area, thereby preventing unnecessary reception and preventing network resources from being wasted.

14 Claims, 7 Drawing Sheets

U.S. PATENT DOCUMENTS

| | | | |
|---|---|---|---|
| 2003/0231612 A1* | 12/2003 | Kim et al. | 370/342 |
| 2004/0081125 A1 | 4/2004 | Ranta-Aho et al. | |
| 2004/0103435 A1 | 5/2004 | Yi et al. | |
| 2004/0228294 A1 | 11/2004 | Kim et al. | |
| 2004/0266461 A1 | 12/2004 | Beckmann et al. | |
| 2005/0111487 A1 | 5/2005 | Matta et al. | |
| 2005/0237960 A1* | 10/2005 | Kim | 370/312 |
| 2006/0040655 A1 | 2/2006 | Kim | |
| 2006/0092911 A1 | 5/2006 | Hwang et al. | |
| 2006/0092973 A1 | 5/2006 | Petrovic et al. | |
| 2006/0140158 A1 | 6/2006 | Terry | |
| 2006/0152083 A1 | 7/2006 | Fuhr et al. | |
| 2006/0245386 A1* | 11/2006 | Hu | 370/312 |
| 2006/0251019 A1* | 11/2006 | Dalsgaard et al. | 370/331 |
| 2006/0251105 A1 | 11/2006 | Kim et al. | |
| 2007/0047452 A1 | 3/2007 | Lohr et al. | |
| 2007/0091810 A1 | 4/2007 | Kim et al. | |
| 2007/0293222 A1* | 12/2007 | Vikberg et al. | 455/436 |
| 2008/0101270 A1* | 5/2008 | Kekki et al. | 370/312 |
| 2009/0028123 A1 | 1/2009 | Terry et al. | |
| 2009/0221293 A1 | 9/2009 | Petrovic et al. | |
| 2010/0091721 A1 | 4/2010 | Larmo et al. | |

FOREIGN PATENT DOCUMENTS

| | | |
|---|---|---|
| EP | 1 724 948 A1 | 11/2006 |
| EP | 1755355 A1 | 2/2007 |
| EP | 1843504 A2 | 10/2007 |
| EP | 1845649 A2 | 10/2007 |
| EP | 1845650 A2 | 10/2007 |
| JP | 2002-527945 A | 8/2002 |
| JP | 2005-525065 A | 8/2005 |
| JP | 2006-524444 A | 10/2006 |
| RU | 2 322 765 C2 | 11/2005 |
| RU | 2 307 467 C2 | 1/2006 |
| RU | 2280327 C2 | 7/2006 |
| WO | 97/11566 A2 | 3/1997 |
| WO | 98/24250 A2 | 6/1998 |
| WO | WO 02/093296 A2 | 11/2002 |
| WO | WO-03/085874 A1 | 10/2003 |
| WO | 03/096149 A2 | 11/2003 |
| WO | 03/096567 A1 | 11/2003 |
| WO | 2005/119941 A1 | 12/2005 |
| WO | WO-2006/022876 A1 | 3/2006 |
| WO | WO-2006/104346 A1 | 10/2006 |
| WO | WO-2006/105333 A1 | 10/2006 |
| WO | 2006/118418 A2 | 11/2006 |
| WO | 2007/068304 A1 | 6/2007 |

OTHER PUBLICATIONS

"Universal Mobile Telecommunications System (UMTS); User Equipment (UE) procedures in idle mode and procedures for cell reselection in connected mode (3GPP Ts 25.304 version 7.1.0 Release 7); ETSI TS 125 304" ETSI Standards, vol. 3-R2, No. V7.1.0, Dec. 1, 2006 XP014039981.

Nokia; "ARQ Operation with HARQ-ARQ Interaction", 3GPP TSG-RAN WG2, R2-062765 [online], Oct. 9, 2006, <http://www.3gpp1.com/ftp/tsg_ran/WG2_RL2/TSGR2_55/Documents/R2-062765.zip>.

Ericsson: "Uplink HARQ-ARQ Interactions for NACK—>ACK Error", 3GPP TSG-RAN WG2, R2-063238 [online], Nov. 6, 2006, <http://www.3gpp.org/ftp/tsg_ran/WG2_RL2/TSGR2_56/Documents/R2-063238.zip>.

Samsung: "MAC functions: ARQ", 3GPP TSG-RAN WG2, R2-060374 [online], Feb. 13, 2006, <ftp://ftp.3gpp.org/tsg_ran/WG2_RL2/TSGR2_51/Documents/R2-060374.zip>.

Herrmann, et al., "Improving Packet Loss Probability in the UMTS High-Speed Downlink," IEEE Vehicular Technology Conference, VTC 2003 Fall, 2003, New York, Oct. 6, 2003, pp. 2655-2659.

Samsung: "DL Control Channel Structure: Overview," 3GPP TSG-RAN WG1, R1-062534 [online], Oct. 9, 2006, <http://www.3gpp.org/ftp/tsg_ran/wg1_rl1/TSGR1_46bis/Docs/R1—062534.zip>.

Ericsson: "E-UTRA Downlink Control Signaling—Open Issues," 3GPP TSG-RAN WG1, R1-061365 [online], May 8, 2006, <http://www.3gpp.org/FTP/tsg_ran/WG1_RL1/TSGR1_45/Docs/R1-061365.zip>.

Rapporteur (MOTOROLA): "Report of E-Mail Discussion: DL Scheduling," 3GPP TSG-RAN WG1, R1-063684 [online], Dec. 12, 2006, <http://www.3gpp.org/ftp/tsg_ran/WG2_RL2/TSGR2_56/Documents/R2-063684.zip>.

LG Electronic: "Downlink Control Signaling," 3GPP TSG-RAN WG1, R1-063177 [online], Nov. 6, 2006, <http://www.3gpp.org/ftp/tsg_ran/WG1_RL1/TSGR1_47/Docs/R1-063177.zip>.

Texas Instruments: "Control Channel Structure and Coding in E-UTRA Downlink," 3GPP TSG-RAN WG1, R1-063220 [online], Nov. 6, 2006, <http://www.3gpp.org/ftp/tsg_ran/WG1_RL1/TSGR1_47/Docs/R1-063220.zip>.

Sharp: "UE Identity in L1/L2 Control Signalling for Downlink Scheduling Resource Allocation," 3GPP TSG-RAN WG2, R2-061129 [online], May 8, 2006, <http://www.3gpp1.com/ftp/tsg_ran/WG2_RL2/TSGR2_53/Documents/R2-061129.zip>.

* cited by examiner

METHOD FOR RECEIVING SYSTEM INFORMATION IN MULTIMEDIA BROADCAST/MULTICAST SERVICE

This application is the National Phase of PCT/KR2008/000569 filed on Jan. 30, 2008, which claims priority under 35 U.S.C. 119(e) to U.S. Provisional Application No. 60/887,550 filed on Jan. 31, 2007, and under 35 U.S.C. 119(a) to Patent Application No. 10-2008-0009262 filed in Korea on Jan. 29, 2008, all of which are hereby expressly incorporated by reference into the present application.

TECHNICAL FIELD

The present invention relates to transmission/reception of system information, and more particularly, to transmission/reception of system information in a Multimedia Broadcast/Multicast Service.

BACKGROUND ART

Figure 1:
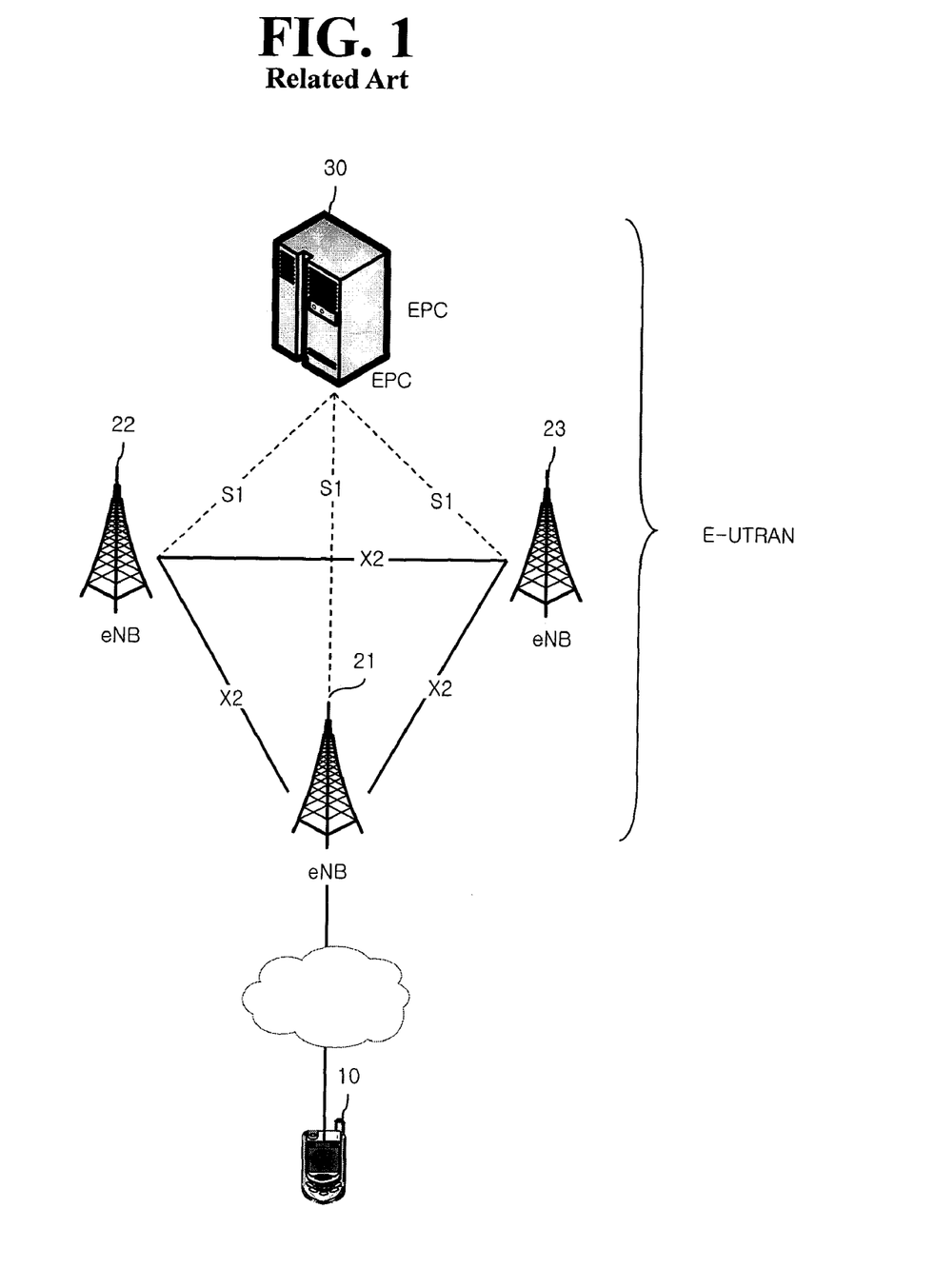
FIG. 1 is an exemplary view illustrating a structure of an E-UTRAN system, a related mobile communication system.

FIG. 1 is an exemplary view illustrating a structure of an E-UTRAN (Evolved Universal Terrestrial Radio Access Network) system, a mobile communication system applicable to the related art and the present invention.

The E-UTRAN system illustrated in FIG. 1 has been evolved from the related UTRAN system, for which the 3GPP (3$^{rd}$ Generation Partnership Project) is proceeding with the preparation of the basic specifications applicable thereto. The E-UTRAN system can be classified as an LTE (Long Term Evolution) system.

The E-UTRAN system includes basic stations (hereafter, referred to as eNode Bs or eNBs) 21, 22, 23, The eNBs 21, 22, 23 are connected with each other through an X2 interface. The eNBs 21, 22, 23 are connected with a terminal (User Equipment; hereafter, abbreviated to UE) 10 through a radio interface, and connected with an EPC (Evolved Packet Core) 30 through an S1 interface.

Layers of a radio interface protocol between the terminal 100 and a network can be divided into an L1 (first layer), an L2 (second layer) and an L3 (third layer) based upon three lower layers of an open system interconnection (OSI) standard model that is well-known in the art of communication systems. A physical layer belonging to the first layer provides an information transfer service using a physical channel, and a radio resource control (hereafter, abbreviated to RRC) layer positioned at the third layer serves to control radio resources between the terminal and the network, for which the RRC layer exchanges an RRC message between the terminal and the network.

Figure 2:
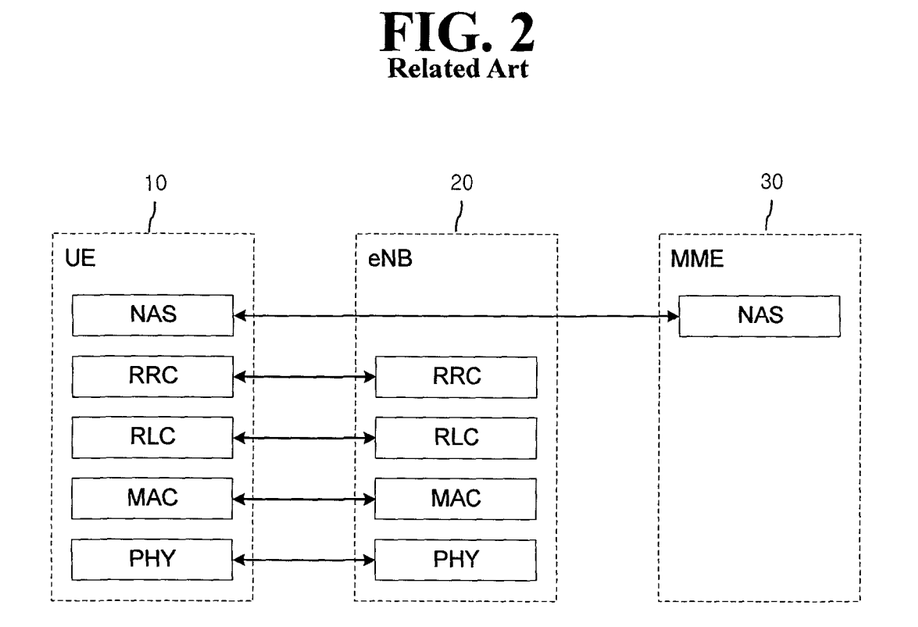
FIG. 2 is an exemplary view illustrating a structure of a radio interface protocol between a terminal and an UTRAN based upon a 3GPP radio access network standard.
Figure 3:
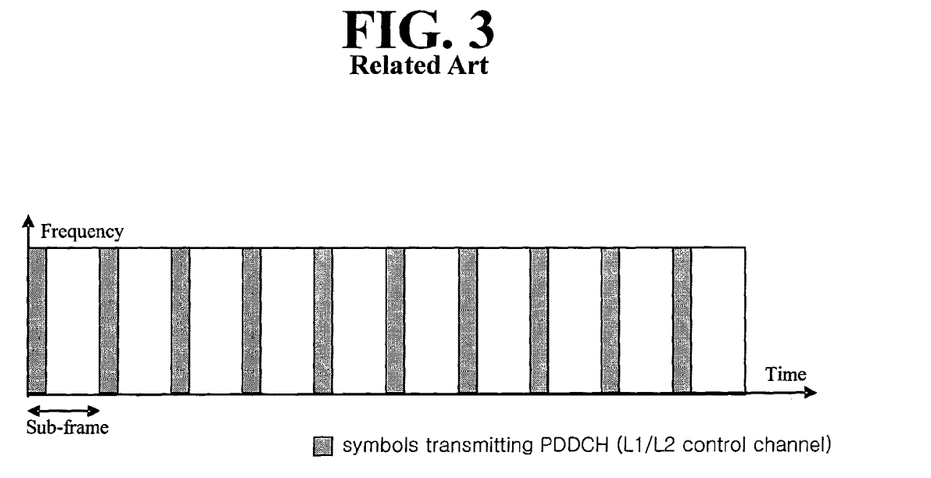
FIG. 3 is an exemplary view illustrating a physical channel.

FIG. 2 illustrates a structure of the radio interface protocol between the terminal and an UTRAN (UMTS Terrestrial Radio Access Network) based upon a 3GPP radio access network standard. And, FIG. 3 is an exemplary view illustrating a physical channel.

The radio interface protocol illustrated in FIG. 2 horizontally includes a physical layer, a data link layer and a network layer. And, the radio interface protocol is vertically divided into a user plane for transmitting data information and a control plane for transmitting control signals.

The protocol layers of FIG. 2 can be divided into an L1 (first layer), an L2 (second layer) and an L3 (third layer) based upon the three lower layers of open system interconnection (OSI) standard model that is well-known in the art of communication systems.

The physical layer, the first layer, provides an information transfer service to an upper layer using a physical channel. The physical layer is connected with a medium access control layer located at a higher level through a transport channel, and transfers data to the medium access control layer via the transport channel.

Meanwhile, between different physical layers, namely, between physical layers of a transmission side and a reception side, data is transferred via the physical channel. The physical channel is modulated by an OFDM (Orthogonal Frequency Division Multiplexing) manner, and uses time and frequency as a radio resource.

The second layer is divided into two lower layers. That is, the second layer is divided into the medium access control (hereafter, abbreviated to MAC) layer and a radio link control (hereafter, abbreviated to RLC) layer. The MAC layer provides a service to the RLC layer, an upper layer, via a logical channel. The RLC layer reliably supports a data transmission. Here, a function of the RLC layer can be implemented as a function block within the MAC layer. In this case, the RLC layer may not be present.

Meanwhile, through it is not illustrated, the second layer further includes a PDCP layer. The PDCP layer performs a header compression function for reducing a size of an IP packet header that is relatively large-sized and has unnecessary control information so as to implement an effective transmission in a radio section having a narrow bandwidth at the time of transmitting an IP packet such as IPv4 or IPv6.

A radio resource control (hereafter, abbreviated to RRC) layer belonging to the third layer is only defined in the control plane, and controls logical channels, transport channels and the physical channels in relation to the configuration, reconfiguration, and release of the radio bearers (abbreviated to RBs). Here, the RB signifies a service provided by the second layer for data transmission between the terminal 10 and the UTRAN. If there is an RRC connection between the RRC layer of the terminal 10 and the RRC layer of the radio network, the terminal 100 is defined to be in an RRC connected mode, and if there is not the RRC connection, the terminal 100 is defined to be in an RRC idle mode.

An NAS (Non-Access Stratum) layer as an upper layer of the RRC layer performs functions such as a session management and a mobility management.

Meanwhile, hereafter, the physical channel, the transport channel and the logical channel will be explained in detail.

First, one cell configured by each eNB 21, 22, 23 is established to have one of the bandwidths 1.25 Mhz, 2.5 Mhz, 5 Mhz, 10 Mhz, 20 Mhz and the like so that an uplink or downlink physical channel is provided to multiple terminals. Here, different cells may be established to have bandwidths different from each other.

With reference to FIG. 3, the physical channel includes multiple sub-frames on a time axis and multiple sub-carriers on a frequency axis. Here, one sub-frame includes a plurality of symbols on the time axis. And, one sub-frame includes a plurality of resource blocks, and one resource block includes a plurality of symbols and a plurality of sub-carriers. Also, each sub-frame can use specific sub-carriers of specific symbols (e.g., first symbol) of corresponding sub-frame for a PDCCH (Physical Downlink Control Channel), namely, an L1/L2 control channel. One sub-frame is 0.5 ms, and TTI (Transmission Time Interval), unit time for transmitting data, is 1 ms corresponding to two sub-frames.

And then, the transport channel is divided into a downlink transport channel for transmitting data from the network to the terminal and an uplink transport channel for transmitting data from the terminal to the network. The downlink transport channel for transmitting data from the network to the terminal includes a broadcast channel (hereafter, referred to as BCH)

for transmitting system information, a paging channel (hereafter, referred to as PCH) for transmitting a paging message, and a downlink shared channel (hereafter, referred to as SCH) for transmitting a user traffic or a control message. Downlink multicast, traffic of a broadcast service or the control message may be transmitted through the downlink SCH or through an additional downlink multicast channel (MCH).

The uplink transport channel for transmitting data from the terminal to the network includes a random access channel (RACH) for transmitting an initial control message and an uplink shared channel (SCH) for transmitting the user traffic and the control message.

Meanwhile, the logical channel includes a BCCH (Broadcast Channel) for broadcasting system control information, a PCCH (Paging Control Channel) for transmitting call information, a CCCH (Common Control Channel) for transmitting control information between the terminal and the network, an MCCH (Multicast Control Channel) for a multimedia broadcast/multicast service, an MTCH (Multicast Traffic Channel) for the multimedia broadcast/multicast service, etc. The BCCH is mapped to the BCH of the transport channel, and the PCCH is mapped to the PCH of the transport channel.

Hereafter, the multimedia broadcast/multicast service (MBMS) will be explained in detail.

The MBMS denotes that a streaming or background service is provided to a plurality of terminals using a downward-dedicated MBMS bearer service. The MBMS bearer uses a point to multipoint radio bearer service and a point to point radio bearer service in the UTRAN.

The MBMS is divided into a broadcast mode and a multicast mode. The MBMS broadcast mode is a service to transmit multimedia data to all users in a broadcast area. Here, the broadcast area relates to an area in which the broadcast service is available. The MBMS multicast mode is a service for transmitting multimedia data only to a specific user group in a multicast area. Here, the multicast area relates to an area in which the multicast service is available. The multicast area and the broadcast area are called as a service area.

A radio network for providing the MBMS service provides an MCCH (MBMS Control Channel) and an MTCH (MBMS Traffic Channel) as logical channels. The MCCH channel is used to transmit control information for an MBMS transmission to the terminal, the MTCH channel is used to transmit the MBMS service to the terminal.

The MBMS service includes one session or a plurality of sessions. Only one session can exist in one time interval. The radio network can transmit an MBMS notification so as to inform session start of the MBMS service or modification of the MBMS control information. Here, the notification is transmitted via the MCCH channel. Meanwhile, the radio network informs the terminal of whether or not the MBMS notification or the control information for a specific service is modified, via a physical channel, an MICH (MBMS notification Indicator Channel).

Meanwhile, the MBMS service can be divided into a multi-cell service for providing a plurality of cells with the same service and a single cell service for providing one cell with the same service. The multi-cell service is transmitted via a transport channel, namely, the MCH, and the single cell service is transmitted via a transport channel, namely, a DL SCH channel. When receiving the multi-cell service via the MCH channel, the terminal can receive the multi-cell service by combining the same multi-cell services transmitted from multiple cells by an MBSFN (MBMS Single Frequency Network) manner.

DISCLOSURE OF THE INVENTION

Technical Problem

In the related art, even though multiple cells have the same system information, when moved to another cell, the terminal should receive system information relating to MBMS from the new cell again. Thus, the related art has a drawback that network resources are wasted.

Therefore, it is an object of the present invention to allow the terminal not to repeatedly receive same system information even if the terminal is moved to another cell when the multiple cells have the same system information.

Technical Solution

To achieve the object, in accordance with one aspect of the present invention, there is provided a method for receiving system information, comprising: receiving indication information with respect to system information in a first area; receiving the system information in the first area; receiving indication information with respect to system information in a second area when moving to the second area from the first area; and determining whether or not to receive the system information in the second area based upon the indication information received in the second area.

Preferably, the area may be a cell or an MBSFN area.

Preferably, the indication information may comprise a value tag or update information with respect to the system information. Also, the indication information may further comprise an identifier of a global MBMS area.

And, the system information may be related to a multimedia broadcast/multicast service.

Preferably, the indication information and the system information may be received via channels different from each other.

Preferably, the indication information may be received via one or more of a control channel corresponding to a first layer or a second layer, a packet data control channel (PDCCH), a broadcast channel (BCH), and a download synchronization channel (DL SCH).

And, the system information may be received via one or more of a broadcast channel (BCH) and a download synchronization channel (DL SCH).

Meanwhile, to achieve the object, in accordance with another aspect of the present invention, there is provided a control method in a server managing a first base station and a second base station, comprising: identifying whether or not system information of the second base station is the same as system information previously transmitted to a terminal from the first base station when the terminal within a coverage of the first base station is moved to a coverage of the second base station; and controlling the second base station so that the second base station does not repeatedly transmit the system information to the terminal when each system information is the same to each other.

Preferably, the server may be an MCE (MBMS Coordinating Entity).

MODES FOR CARRYING OUT THE PREFERRED EMBODIMENTS

Hereinafter, embodiments in accordance with the present invention will be explained in detail with reference to accompanying drawings.

Figure 4:
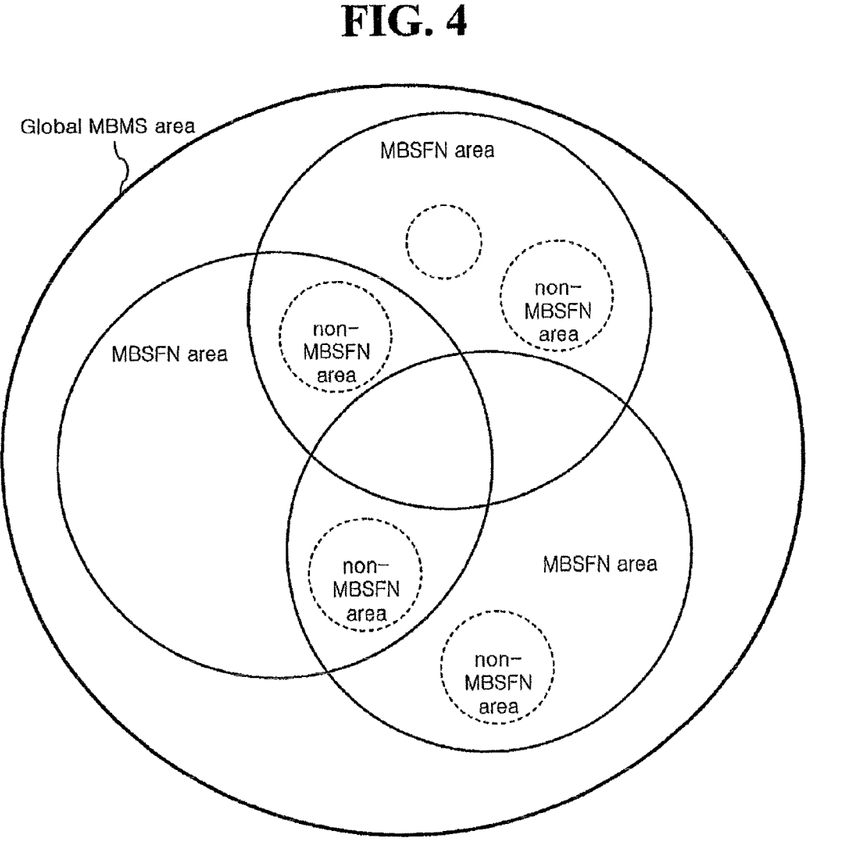
FIG. 4 is an exemplary view illustrating a global MBMS area and an MBSFN area in accordance with the present invention.
Figure 5:
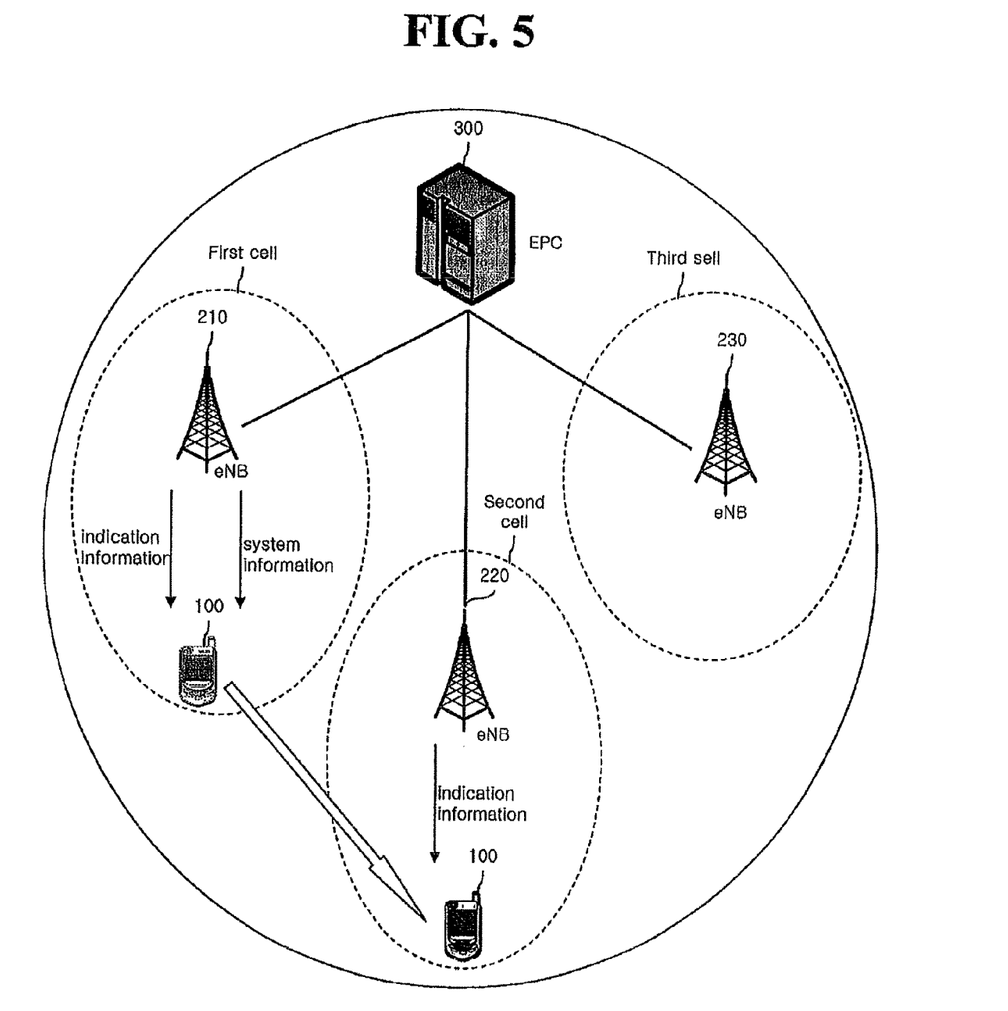
FIG. 5 is an exemplary view illustrating a method for transmitting system information in an MBMS in accordance with the present invention.

FIG. 4 is an exemplary view illustrating a global MBMS area and an MBSFN area in accordance with the present invention, and FIG. 5 is an exemplary view illustrating a method for transmitting system information in an MBMS in accordance with the present invention.

With reference to FIG. 4, one global MBMS area may include multiple MBSFN areas and multiple non-MBSFN areas. The MBSFN area supports reception of a specific MBMS service by an MBSFN combination manner. That is, when a terminal is moved to another cell in the same MBSFN area, the terminal can seamlessly use the specific MBMS service without performing a handover or a reconfiguration process.

Here, with reference to FIG. 5, the present invention allows a terminal 100 not to receive the same system information from corresponding cell when the terminal 100 is moved to another cell in a global MBMS area. An MCE (MBMS Coordinating Entity) located at a network manages the global MBMS areas. Here, the MCE may be an EPC 300 illustrated in the drawing. Thus, the MCE controls base stations 210, 220, 230 of the cells so as not to repeatedly transmit the same system information to the same terminal. Meanwhile, the MCE handles scheduling of an MCH channel transmitted by the MBSFN combination manner.

Particularly, when the terminal 100 is moved to a second cell within the same global MBMS area after obtaining system information from the first base station 210 of a first cell within the global MBMS area, the terminal 100 can use the system information received in the first cell even in the second cell, which allows the terminal 100 not to repeatedly receive the same system information from the second base station 220 of the second cell. But, in case that the system information is different from each other or the content of system information is modified, the terminal 100 should receive the system information in the second cell.

The method for not receiving the same system information will be explained in detail with reference to FIG. 6.

Figure 6:
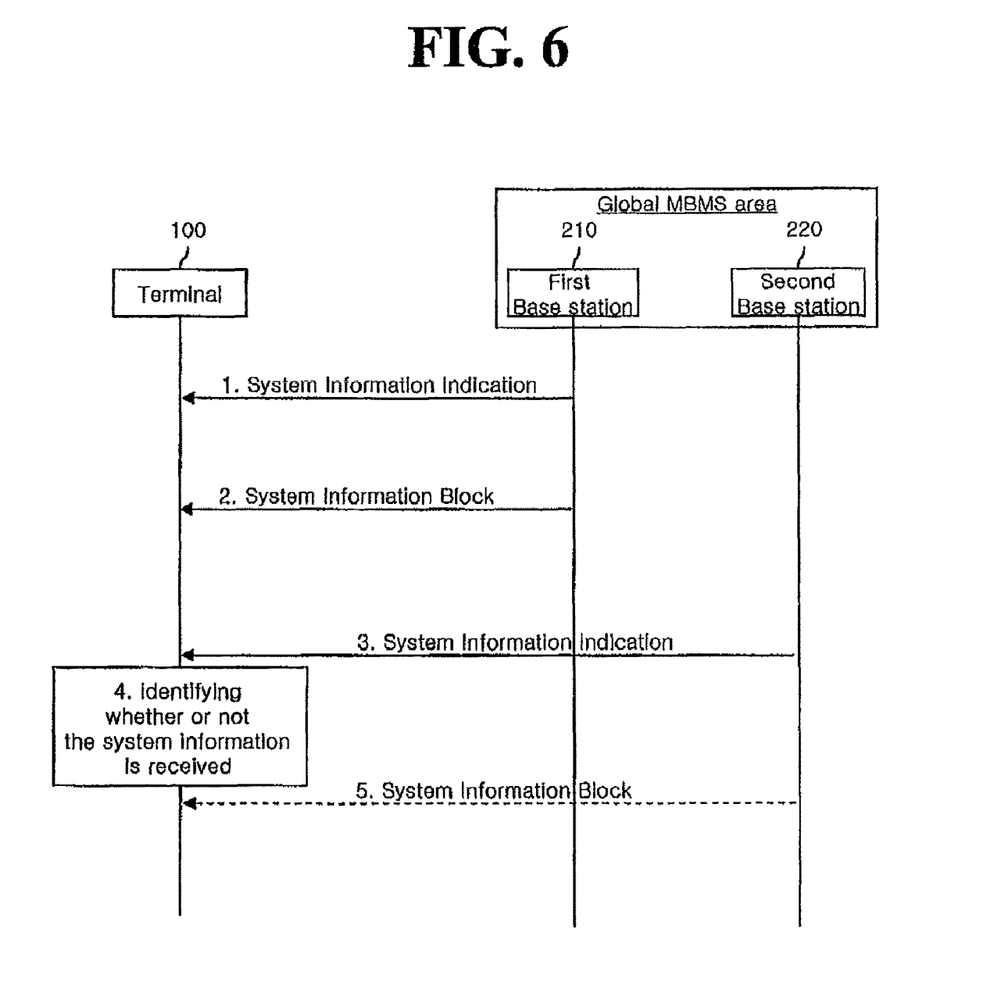
FIG. 6 is a signal flow chart illustrating a method for transmitting system information in the MBMS in accordance with the present invention.

FIG. 6 is a signal flow chart illustrating a method for transmitting system information in the MBMS in accordance with the present invention.

With reference to FIG. 6, each base station has the same system information relating to MBMS in the cells belonging to the same global MBMS area, thus the same system information is not repeatedly transmitted when the terminal 100 is moved to another cell within the global MBMS area. Here is the detailed explanation as follows.

1) The terminal 100 receives indication information with respect to the system information relating MBMS from the first base station 210 of the first cell. The indication information corresponds to a value tag with respect to a block of the system information or update information with respect to the system information. The indication information includes an identifier of the global MBMS area to which the corresponding cell belongs. Here, the indication information may be transmitted through a BCCH corresponding to the logical channel and a BCH corresponding to the transport channel. Alternately, the indication information may be transmitted through an L1/L2 control channel (for example, PDCCH channel).

2) The terminal 100 receives the block of the system information relating MBMS from the first base station 210 of the first cell. And, the terminal 100 stores the indication information and the system information received from the first base station 210 of the first cell. The system information block may be transmitted through the same channel as through which the indication information is transmitted or a channel different from the indication channel. For example, when the indication information is transmitted through the BCCH corresponding to the logical channel and the BCH corresponding to the transport channel, the block of the system information may be transmitted through the BCCH corresponding to the logical channel and the DL SCH corresponding to the transport channel. Alternately, as another example, when the indication information is transmitted through a control channel (e.g., PDCCH channel) of a first layer/second layer (L1/L2), the block of the system information may be transmitted through the BCCH corresponding to the logical channel, the BCH corresponding to the transport channel or the DL SCH corresponding to the transport channel. Here, the BCCH is transmitted within one global MBMS area by the MBSFN combination manner with respect to multiple cells. Thus, content of the system information transmitted through the BCCH is the same in multiple cells within the global MBMS area.

The block of the system information relating to MBMS may include transport information of an MCCH channel or an MBMS notification channel in a specific cell or MBSFN area. The transport information includes information of radio resources used for transmission of the MCCH channel or the MBMS notification channel. Here, the block of the system information relating to MBMS includes a cell identifier of a specific cell and the information of radio resources used for transmission of the MCCH channel or the MBMS notification channel in the cell. Alternately, the block of the system information relating MBMS includes an identifier of a specific MBSFN area and the information of the radio resources used for transmission of the MCCH channel or the MBMS notification channel in the MBSFN area.

3) And then, the terminal 100 is moved to another cell within the global MBMS area, for example, a second cell. Then, the terminal 100 receives indication information with respect to the system information relating to MBMS from the second base station 220 of the second cell.

4) The terminal 100 checks whether or not to newly receive a block of the system information relating to MBMS from the second base station 220 based upon the indication information received from the second base station 220. That is, the terminal 100 checks whether or not the content of the indication information of the second cell is the same as the content of the indication information of the first cell.

Here, if it is not required to newly receive the block of the system information relating to MBMS from the second base station 220, the terminal not receives the block of the system information relating to MBMS from the second base station 220 of the second cell, but reuses the system information pre-received from the first base station 210. As such, for examples to the case that the system information is not required to be newly received, there is a case that the first and second cells are determined to belong to the same global MBMS area, or a case that it is determined not to modify the system information by checking the indication information from the second base station 220.

5) However, if it is required to newly receive the block of the system information relating to MBMS, the terminal 100 receives the block of the system information relating to MBMS from the second base station 220 of the second cell. As such, for examples to the case that the system information is required to be newly received, there is a case that the first and second cells don't belong to the same global MBMS area, or a case that the system information is modified even through the first and second cells belong to the same global MBMS area.

The method in accordance with the present invention as so far described may be implemented by software, firmware, hardware, or any combination thereof. For example, the method in accordance with the present invention may be implemented by codes or command words in a software program that is operable by a processor (e.g., internal microprocessor of mobile terminal), and be stored in a storage medium (e.g., internal memory, flash memory, hard disk, etc. of mobile terminal). Hereafter, implementation by the hardware will be explained in detail.

Figure 7:
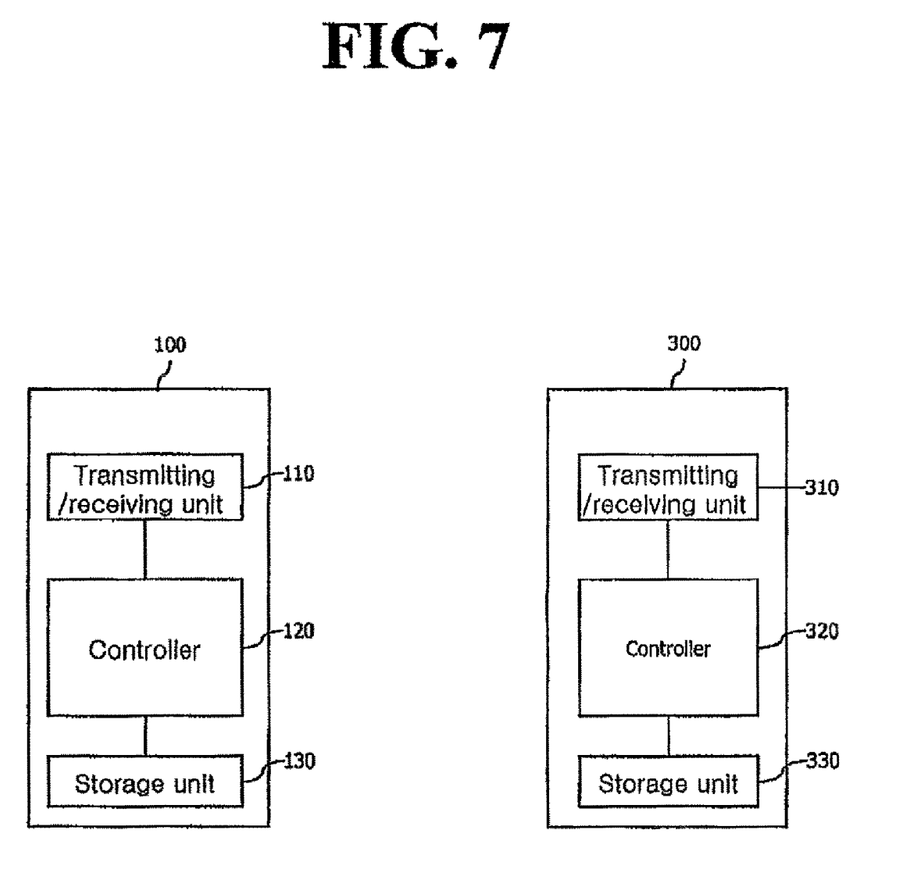
FIG. 7 is a block diagram illustrating a configuration of a terminal and an EPC in accordance with the present invention.

FIG. 7 is a block diagram illustrating a configuration of the terminal 100 and an EPC 300 in accordance with the present invention.

The terminal 100 receives the indication information and the system information within a coverage of the first base station 210, namely, the first cell. And then, when moved to a coverage of the second base station 220, namely, the second cell, the terminal 100 receives indication information with respect to system information from the second base station 220, and then determines whether or not to receive the system information from the second base station 220 base upon the indication information, thereby not repeatedly receiving the system information.

As shown, the terminal 100 includes a transmitting/receiving unit 110, a controller 120 and a storage unit 130.

The transmitting/receiving unit 110 receives the indication information and the system information within the coverage of the first base station 210, namely, the first cell. And then, when moved to the coverage of the second base station 220, namely, the second cell, the transmitting/receiving unit 110 receives the indication information with respect to the system information from the second base station 220.

The controller 120 determines whether or not to receive the system information from the second base station 220 base upon the indication information received from the second base station 220.

The storage unit 130 stores the indication information and the system information received from the first base station 210.

Meanwhile, the EPC 300 manages the global MBMS areas and is also called as an MCE (MBMS Coordinating Entity). The EPC 300 is connected with base stations, for example, the first base station 210 and the second base station 220.

When the terminal 100 located in the coverage of the first base station 210, namely, the first cell, is moved to the coverage of the second base station 220, namely, the second cell, the EPC 300 identifies whether or not the system information of the second base station 220 is the same as the system information previously transmitted to the terminal from the first base station 210. And then, if each system information is the same to each other, the EPC 300 controls the second base station 220 so that the system information may not be repeatedly transmitted to the terminal 100 from the second base station 220.

The EPC 300 includes a transmitting/receiving unit 310, a controller 320 and a storage unit 330.

The transmitting/receiving unit 310 receives information on whether or not the indication information and the system information are transmitted to the terminal 100, from the base stations, for example, the first base station 210 and the second base station 220.

The controller 320 checks whether or not the system information of the second base station 220 is the same as the system information previously transmitted to the terminal from the first base station 210 based upon whether or not the information received through the transmitting/receiving unit 310 is transmitted. And then, if each system information is the same to each other, the controller 320 controls the second base station 220 so that the system information may not be repeatedly transmitted to the terminal 100 from the second base station 220.

The storage unit 330 stores whether or not the indication information and the system information are transmitted to the terminal 100 from the first base station 210 and the second base station 220 through the transmitting/receiving unit 310.

As aforementioned, the present invention allows the terminal not to receive the same system information from corresponding cell when the terminal is moved to another cell within the global MBMS area, thereby preventing the terminal from unnecessarily receiving the system information.

Further, the present invention prevents unnecessary reception, thereby preventing network resources from being wasted.

Though the present invention is disclosed with respect to preferable embodiments in the above description, it will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for receiving system information by a receiver in a wireless network, the method performed by the receiver and comprising:
wirelessly receiving, from a first base station in a first area, first indication information about first system information of the first area;
wirelessly receiving, from the first base station, the first system information of the first area;
storing the first indication information and the first system information;
using the first system information in the first area;
upon moving to a second area from the first area, wirelessly receiving, from a second base station in the second area, second indication information about second system information of the second area;
storing the second indication information and using the second indication information to determine whether or not the second system information is the same as the stored first system information in order to determine whether or not to receive the second system information;
upon determining that the second system information is the same as the first system information and therefore is not to be received, not receiving the second system information from the second base station and using the first system information in the second area; and upon determining that the second system information is not the same as the first system information and therefore is to be received, wirelessly receiving the second system information from the second base station, storing the second system information, and using the second system information in the second area.

2. The method of claim 1, wherein each of the first and second indication information comprises a value tag or update information corresponding to the each of the first and second system information.

3. The method of claim 1, wherein each of the first and second indication information comprises an identifier of a global MBMS area.

4. The method of claim 1, wherein each of the first and second area is a cell or an MBSFN area.

5. The method of claim 1, wherein each of the first and second indication information is received via one or more of a control channel corresponding to a first layer or a second layer, a packet data control channel (PDCCH), a broadcast channel (BCH), and a download synchronization channel (DL SCH).

6. The method of claim 1, wherein each of the first and second system information is related to a multimedia broadcast/multicast service.

7. The method of claim 1, wherein each of the first and second system information is received via one or more of a broadcast channel (BCH) and a download synchronization channel (DL SCH).

8. The method of claim 1, wherein each of the first and second indication information and each of the first and second system information are received via channels different from each other.

9. A method of controlling a wireless network including a first base station in a first area and a second base station in a second area, the method performed by a server and comprising:

controlling the first base station to transmit, to a mobile terminal, first indication information about first system information of the first area;
controlling the first base station to transmit, to the mobile terminal, the first system information of the first area,
wherein the first indication information and the first system information are stored and used by the mobile terminal;
controlling the second base station to wirelessly transmit, to the mobile terminal, second indication information about second system information of the second area;
determining whether or not the second system information is the same as the first system information;
upon determining that the second system information is the same as the first system information, controlling the second base station to not transmit the second system information to the mobile terminal so that the mobile terminal uses the first system information in the second area; and
upon determining that the second system information is not the same as the first system information, controlling the second base station to wirelessly transmit the second system information to the mobile terminal so that the mobile terminal uses the second system information in the second area.

10. The method of claim 9, wherein the server is an MCE (MBMS Coordinating Entity).

11. The method of claim 9, further comprising:
receiving, from the first base station, at least one first indication that indicates whether or not the first indication information and the first system information have been transmitted to the mobile terminal;
receiving, from the second base station, at least one second indication that indicates whether or not the second indication information and the second system information have been transmitted to the mobile terminal; and
storing the at least one first indication and the at least one second indication.

12. A user device in a wireless network, comprising:
a transmitting/receiving unit;
a storage unit; and
a controller operatively connected to the transmitting/receiving unit and the storage unit, the controller configured to:
wirelessly receive, from a first base station in a first area, first indication information about first system information of the first area,
wirelessly receive, from the first base station, the first system information of the first area,
store the first indication information and the first system information,
use the first system information in the first area,
upon moving to a second area from the first area, wirelessly receive, from a second base station in the second area, second indication information about second system information of the second area,
store the second indication information and use the second indication information to determine whether or not the second system information is the same as the stored first system information in order to determine whether or not to receive the second system information,
upon determining that the second system information is the same as the first system information and therefore is not to be received, not receive the second system information from the second base station and use the first system information in the second area, and
upon determining that the second system information is not the same as the first system information and therefore is to be received, wirelessly receive the second system information from the second base station, store the second system information, and use the second system information in the second area.

13. A server in a wireless network including a first base station in a first area and a second base station in a second area, the server comprising:
a transmitting/receiving unit;
a storage unit; and
a controller operatively connected to the transmitting/receiving unit and the storage unit, the controller configured to:
control the first base station to transmit, to a mobile terminal, first indication information about first system information of the first area,
control the first base station to transmit, to the mobile terminal, the first system information of the first area,
wherein the first indication information and the first system information are stored and used by the mobile terminal,
control the second base station to wirelessly transmit, to the mobile terminal, second indication information about second system information of the second area,
determine whether or not the second system information is the same as the first system information,
upon determining that the second system information is the same as the first system information, control the second base station to not transmit the second system information to the mobile terminal, and upon determining that the second system information is not the same as the first system information, control the second base station to wirelessly transmit the second system information to the mobile terminal.

14. The server of claim 13, wherein the controller is further configured to receive, from the first base station, at least one first indication that indicates whether or not the first indication information and the first system information have been transmitted to the mobile terminal, receive, from the second base station, at least one second indication that indicates whether or not the second indication information and the second system information have been transmitted to the mobile terminal, and store the at least one first indication and the at least one second indication.

* * * * *

UNITED STATES PATENT AND TRADEMARK OFFICE
CERTIFICATE OF CORRECTION

PATENT NO. : 8,265,007 B2  
APPLICATION NO. : 12/521503  
DATED : September 11, 2012  
INVENTOR(S) : Young-Dae Lee et al.

Page 1 of 1

It is certified that error appears in the above-identified patent and that said Letters Patent is hereby corrected as shown below:

ON THE TITLE PAGE:

Please insert the following:

--Related U.S. Application Data

(60) Provisional application No. 60/887,550, filed on Jan. 31, 2007.--

Signed and Sealed this  
Eighth Day of January, 2013

David J. Kappos  
*Director of the United States Patent and Trademark Office*